G. S. BEEMER.
TRAP SETTING IMPLEMENT.
APPLICATION FILED APR. 29, 1912.
1,040,998.
Patented Oct. 15, 1912.
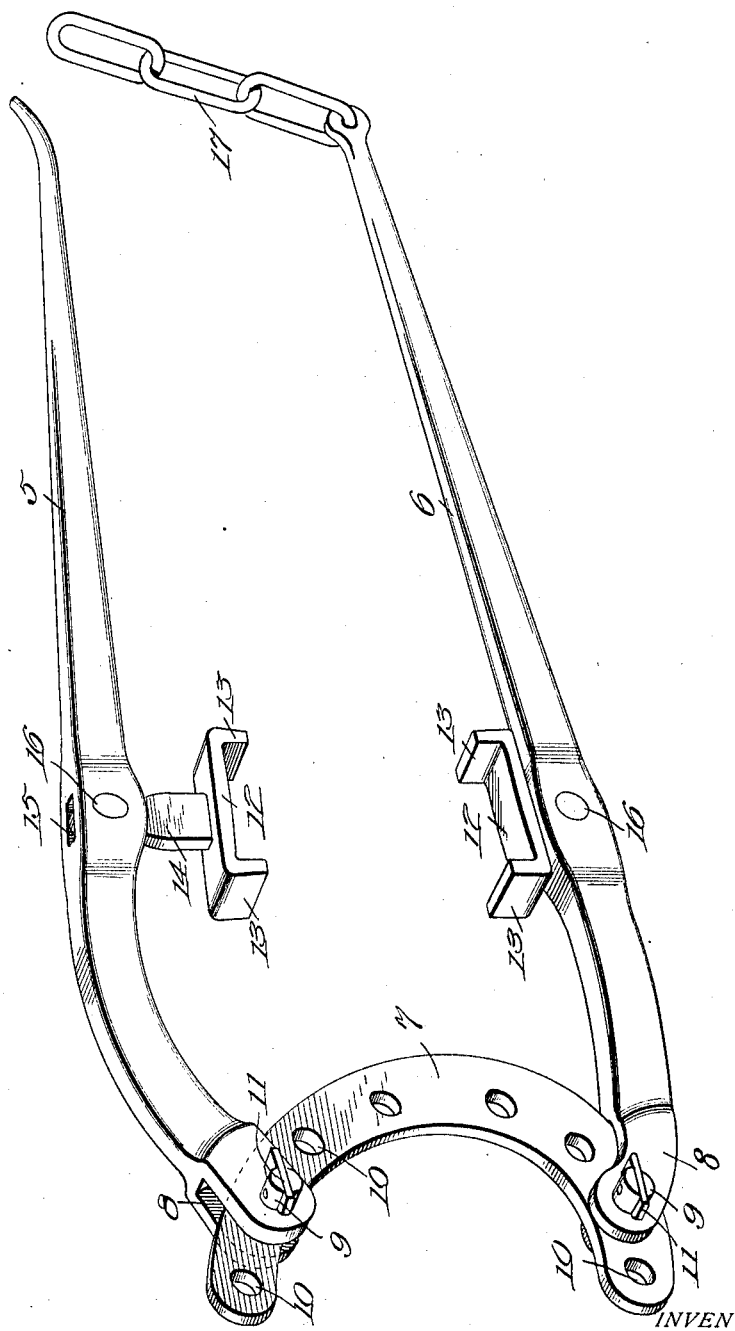
WITNESSES
H.C. Barry
D. L. Neidman
INVENTOR
George S. Beemer
BY Max A. Schmidt
Attorney

UNITED STATES PATENT OFFICE.

GEORGE S. BEEMER, OF MEEKER, COLORADO.

TRAP-SETTING IMPLEMENT.

1,040,998. Specification of Letters Patent. Patented Oct. 15, 1912.

Application filed April 29, 1912. Serial No. 693,895.

*To all whom it may concern:*

Be it known that I, GEORGE S. BEEMER, a citizen of the United States, residing at Meeker, in the county of Rio Blanco and State of Colorado, have invented certain new and useful Improvements in Trap-Setting Implements, of which the following is a specification.

This invention relates to improvements in implements for setting animal traps which are too large to be set by hand, and its object is to provide an implement whereby the trap can be quickly and easily set, and, furthermore, to provide an implement which can be adjusted to traps of different sizes.

With these objects in view, the invention consists in a novel construction and arrangement of parts to be hereinafter described and claimed, and in order that the invention may be better understood, reference is had to the accompanying drawing in which a perspective view of the implement is shown.

In the drawing, 5 and 6 denote two handlevers each of which is pivotally connected at one end to a curved bar 7, said end being forked as indicated at 8 to straddle the bar. A pivot bolt 9 passing through the forked end of the lever, and through one of a series of bolt holes 10 in the bar, provides the pivotal connection between the lever and the bar. A series of bolt holes is provided in order that the levers may be adjusted toward and from each other, whereby the implement is adapted for different sized traps. The pivot bolts are removable, and are provided with a pivoted end-lock 11. Intermediate its ends, adjacent to the pivot, each lever carries at its inner edge a jaw 12 to grip the trap spring. The jaw has outstanding side flanges 13 between which the trap spring is placed and held from slipping out of the jaw. A shank 14 extends from the jaw into a slot 15 in the lever, in which slot it is pivoted by means of a transverse pin 16, whereby the jaw is permitted to rock sidewise to a limited extent. The shank of the upper jaw is much longer than the shank of the lower jaw, so that said upper jaw may freely rock sidewise. The movement of the lower jaw is very slight. The free end of one of the levers carries a chain 17 which is adapted to be hooked over the corresponding end of the other lever, after the levers are closed up to set the trap, whereby the levers are locked and prevented from swinging open.

In operation, after the levers are properly connected to the bar 7 according to the size of the trap, the implement is placed on the ground, with the lever which carries the chain 17, at the bottom. The lower part of the trap spring is placed in the bottom jaw, and the upper part of the trap spring in the top jaw, and the upper lever is then pressed down, to bring the two ends of the trap spring together to set the trap, after which the chain 17 is placed in locking position. The trap is now securely locked in set position, and may be baited without danger of being sprung, and after being baited, the chain will be unhooked and the implement opened up and removed from the trap.

The implement is devoid of complicated parts to get out of order, and by its use a trap can be easily and quickly set.

I claim:

A trap setting implement comprising a pair of opposite levers, a rigid connecting bar, pivot bolts connecting one end of the levers to the bar, said bar having a series of apertures for the pivot bolt to permit adjustment, and said pivot bolts being removable, and a jaw on the inner edge of each lever intermediate the ends thereof, said jaws facing one another and having outstanding side flanges, and one of the jaws being pivoted.

In testimony whereof I affix my signature in presence of two witnesses.

GEORGE S. BEEMER.

Witnesses:
 CLAUDE J. WILSON,
 OSMER E. SMITH.

---

Copies of this patent may be obtained for five cents each, by addressing the "Commissioner of Patents, Washington, D. C."